(12) United States Patent
Teulet

(10) Patent No.: US 9,604,409 B2
(45) Date of Patent: Mar. 28, 2017

(54) METHOD FOR MANUFACTURING AN OBJECT BY SOLIDIFYING POWDER USING A LASER BEAM WITH THE INSERTION OF A MEMBER FOR ABSORBING DEFORMATIONS

(75) Inventor: Patrick Teulet, Riom (FR)

(73) Assignee: PHENIX SYSTEMS, Riom (FR)

( * ) Notice: Subject to any disclaimer, the term of this patent is extended or adjusted under 35 U.S.C. 154(b) by 341 days.

(21) Appl. No.: 13/824,441

(22) PCT Filed: Apr. 27, 2012

(86) PCT No.: PCT/EP2012/057825
§ 371 (c)(1),
(2), (4) Date: Jun. 4, 2013

(87) PCT Pub. No.: WO2012/146746
PCT Pub. Date: Nov. 1, 2012

(65) Prior Publication Data
US 2013/0256953 A1    Oct. 3, 2013

(30) Foreign Application Priority Data
Apr. 29, 2011    (FR) ...................................... 11 53683

(51) Int. Cl.
*B29C 67/00* (2006.01)
*B22F 3/105* (2006.01)

(52) U.S. Cl.
CPC ........ *B29C 67/0077* (2013.01); *B22F 3/1055* (2013.01); *B29C 67/0092* (2013.01);
(Continued)

(58) Field of Classification Search
CPC ............ B29C 67/0077; B29C 67/0051; B29C 67/0074; B29C 67/0092
(Continued)

(56) References Cited

U.S. PATENT DOCUMENTS 5,216,616 A * 6/1993 Masters ........................ 264/401
6,520,996 B1 * 2/2003 Manasas et al. ............. 623/23.5
(Continued)

FOREIGN PATENT DOCUMENTS

DE    195 07 881    9/1995
EP    1 358 855    11/2003
(Continued)

OTHER PUBLICATIONS

International Search Report dated Jun. 1, 2012, corresponding to PCT/EP2012/057825.
(Continued)

*Primary Examiner* — Christina Johnson
*Assistant Examiner* — Xue Liu
(74) *Attorney, Agent, or Firm* — Young & Thompson

(57) ABSTRACT

Method for manufacturing an object, includes: a) depositing a first layer of powder onto a work area constituted by a plate; b) compacting the first layer; c) solidifying a first area of the layer compacted in step b) using a laser beam, the area corresponding to a section of the bottom of the finished object; and d) repeating steps a) through c) until the object is obtained. An additional step e) before step c) includes producing, by solidifying a powder using the laser beam, a member for absorbing deformations to be arranged between the work area and an area to be part of an area corresponding to a portion of a bottom of the finished object. The absorption member produced includes a deformable substrate including a plurality of blades capable of connecting a surface of the plate to the first area constituting a surface of a bottom of the object.

10 Claims, 4 Drawing Sheets

(52) U.S. Cl.
CPC ... *B22F 2003/1056* (2013.01); *B22F 2999/00* (2013.01); *Y02P 10/295* (2015.11)

(58) Field of Classification Search
USPC .......................................................... 264/497
See application file for complete search history.

(56) References Cited

U.S. PATENT DOCUMENTS

| | | | |
|---|---|---|---|
| 2002/0130112 A1* | 9/2002 | Manasas | A61F 2/442 219/121.64 |
| 2009/0202378 A1* | 8/2009 | Illston | 419/1 |

FOREIGN PATENT DOCUMENTS

| | | |
|---|---|---|
| EP | 2 022 622 | 2/2009 |
| GB | 2 458 745 | 10/2009 |
| JP | 2000 218708 | 8/2000 |
| JP | 2001-018298 | 1/2001 |
| JP | 2007-281049 | 10/2007 |
| JP | 2014-506895 | 1/2016 |

OTHER PUBLICATIONS

Ingo Uckelmann, "Generative Serienfertigung von individuellen Produkten aus Cocr mit dem Selektiven Laser-Schmelzen", Jan. 31, 2006.

C. Groth et al., "Modulares Simulationssystem für das Strahlschmelzen (SimSint)", Dec. 2010.

M.F. Zaeh, "A three dimensional FE-model for the investigation of transient physical effects in Selective Laser Melting", 2015, Institute for Machine Tools and Industrial Management (iwb), Munich, Germany.

Christoph Over, "Generative Fertigung von Bauteilen aus Werkzeugstahl X38CrMoV5-1 and Titan TiAl6V4 mit, Selective Laser Melting", Jun. 18, 2003.

Wilhelm Meiners, "Direktes Selektives Laser Sintem einkomponentiger metallischer Werkstoffe", Apr. 15, 1999.

Peter Mercelis et al., (2006) "Residual stresses in selective laser sintering and selective laser melting", Rapid Prototyping Journal, vol. 12, Issue 5, pp. 254-265.

Notice of opposition to a European patent dated Nov. 17, 2015; Application No. 12 719 340.7.

* cited by examiner

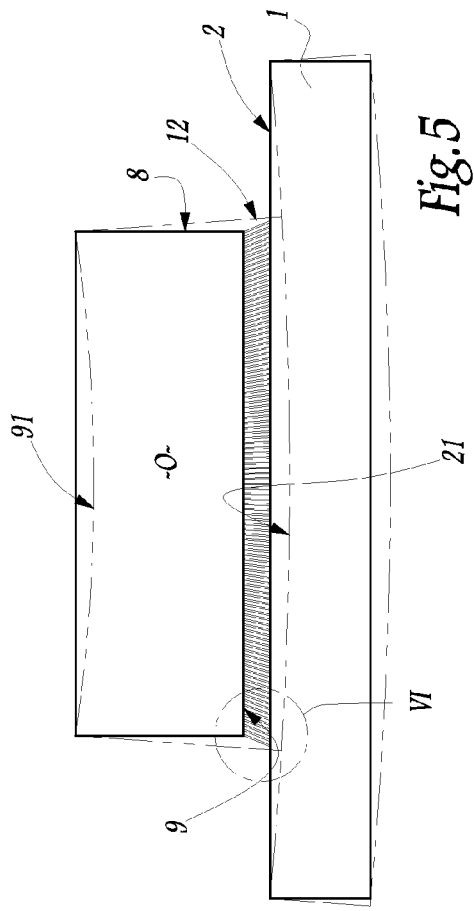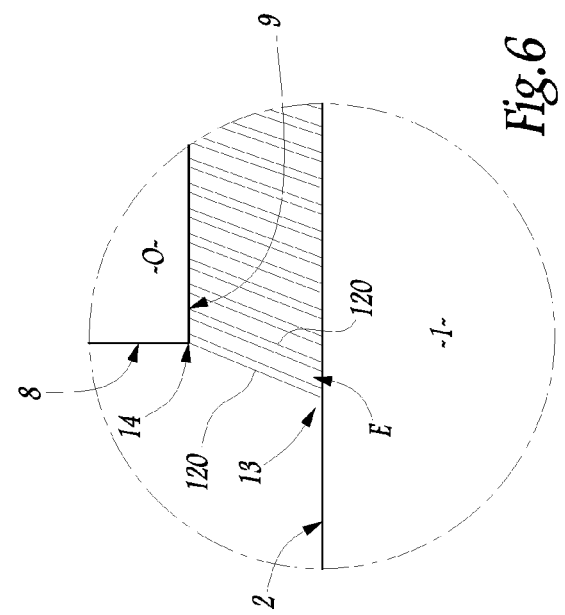

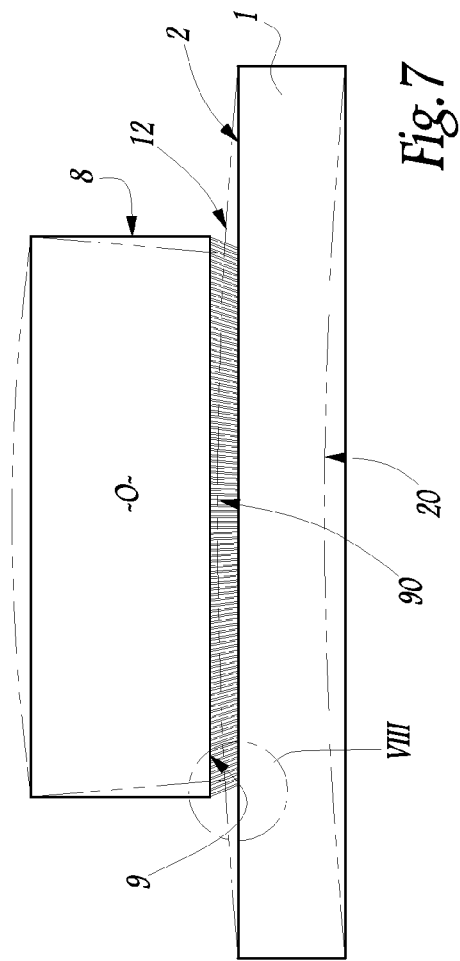
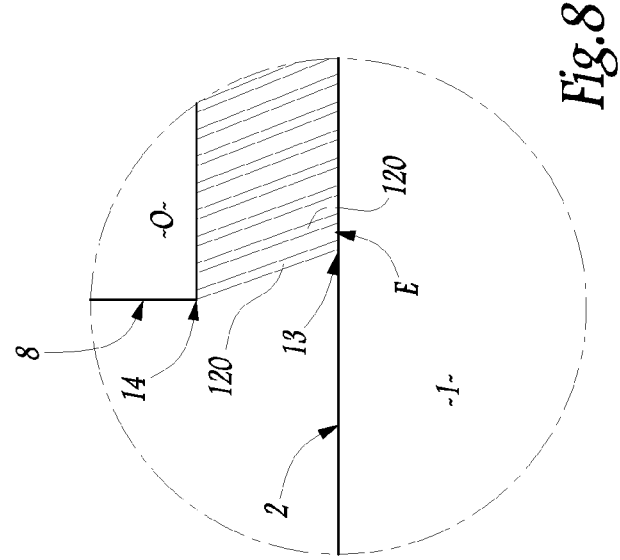

METHOD FOR MANUFACTURING AN OBJECT BY SOLIDIFYING POWDER USING A LASER BEAM WITH THE INSERTION OF A MEMBER FOR ABSORBING DEFORMATIONS

BACKGROUND OF THE INVENTION

Field of the Invention

The invention relates to a method for manufacturing an object by solidifying powder using a laser beam, with the insertion of a member for absorbing deformations.

Herein, the term powder should be understood to denote a powder or a powder mixture. This powder, or this powder mixture, may be mineral, for example ceramic, or metallic. The term solidification denotes a method for manufacturing an object by successively solidifying a plurality of overlaid layers of powder or powder mixture. These layers are previously spread and compacted on a plate acting as a work area. Each layer of powder, or powder mixture, is solidified at areas constituting the walls of the object, using a laser beam. Such solidification is also referred to as sintering and this term will be used hereinafter.

When manufacturing thick-walled and/or large objects, the appearance of some deformations may be observed. These deformations occur when the constituent material of the object, i.e. the solidified powder, has reached a certain temperature after treatment with the laser beam. The temperature reached in the layers of sintered powder constituting the walls of the object is dependent not only on the thermal energy provided by the laser beam but also on the thermal conductivity coefficient of the solidified powder. Furthermore, due to the size thereof, the shape thereof and/or the type of powder, the object has a given linear expansion coefficient. Insofar as the object is manufactured on a plate made of a rigid material, this plate also has a specific thermal conductivity coefficient and expansion coefficient.

During the production process, the object has a temperature varying in the course of production, i.e. it increases at each passage of the laser beam. In parallel with the temperature rise in the object, a temperature rise in the plate acting as the work surface is observed.

The temperature of the sintered object is, in principle, always greater than that of the plate since the object receives the energy emitted by the laser beam. If the expansion coefficient of the plate is greater than or equal to that of the object, a first type of deformation of the plate is observed. In this case, the plate has a surface, intended to be in contact with a complementary surface of the object, which is convex. This deformation of the plate impacts the object which thus exhibits complementary deformation, i.e. the object has at least one concave surface intended to be in contact with the convex face of the plate.

On the other hand, if the expansion coefficient of the object is greater than that of the plate, since the temperature of the object is always greater than that of the plate, another type of deformation is observed. In this case, at least one surface of the object, intended to be in contact with the plate, is concave. In this case, the plate exhibits complementary deformation, i.e. with at least one convex surface intended to be in contact with the object.

If the temperature of the object is less than that reached by the plate, regardless of the respective expansion coefficients of the object and the plate, deformation of one surface of the object intended to be in contact with the plate, which is convex whereas the complementary surface of the plate is concave, is observed.

Description of the Related Art

One of the known solutions for remedying these deformations is that of using, both for the plate and for manufacturing the object, materials wherein the thermal conductivity and/or expansion coefficients are sufficiently similar for the dimensional variations of the plate and the object to be equivalent. This is difficult to carry out since not all objects are made from powder having a similar expansion coefficient to that of the constituent material of the plate, at least in terms of mechanical properties. Furthermore, the temperatures of the object and the plate vary during the production process. For this reason, deformations may occur to varying degrees according to the temperatures.

EP-A-2 022 622 describes a method for manufacturing an object held in position in a frame, during the manufacture thereof, by braces having a complex shape arranged on the periphery of the object. These braces are not effective in preventing the appearance of deformations, insofar as the object retains a bottom wall surface in contact with the plate. Moreover, these braces require the use of a large volume of powder and a plate having relatively larger dimensions than those of the finished object, which is not satisfactory.

BRIEF SUMMARY OF THE INVENTION

The invention is more specifically intended to remedy these drawbacks by offering a method which is easy to implement and mitigating most deformations.

For this purpose, the invention relates to a method for manufacturing an object by solidifying powder as disclosed below.

In this way, with a member for absorbing deformations arranged between the object and the plate, during the manufacture of the object, any deformations are absorbed, both on the plate and the object, regardless of the temperatures, thermal conductivity and/or expansion coefficients of the object and the plate.

Advantageous, but optional, aspects of this method are also disclosed below.

BRIEF DESCRIPTION OF THE DRAWINGS

The invention will be understood better and further advantages thereof will emerge more clearly on reading the description hereinafter of two embodiments of a manufacturing method by solidifying powder using a laser according to the invention, given merely as an example and with reference to the appended figures wherein:

FIG. 5 is a view of one side of a finished object and the plate, in FIGS. 3 and 4, a member for absorbing deformations, produced according to the method according to a first embodiment of the invention, in the case of absorption of the type of deformation illustrated in FIG. 3 represented, wherein the deformation is illustrated with phantom lines, FIG. 6 is a view, on a larger scale, of the detail VI in FIG. 5, and FIGS. 7 and 8 are figures equivalent to FIGS. 5 and 6 in the case of the type of deformation illustrated in FIG. 4.

DETAILED DESCRIPTION OF THE PREFERRED EMBODIMENTS

Figure 1:
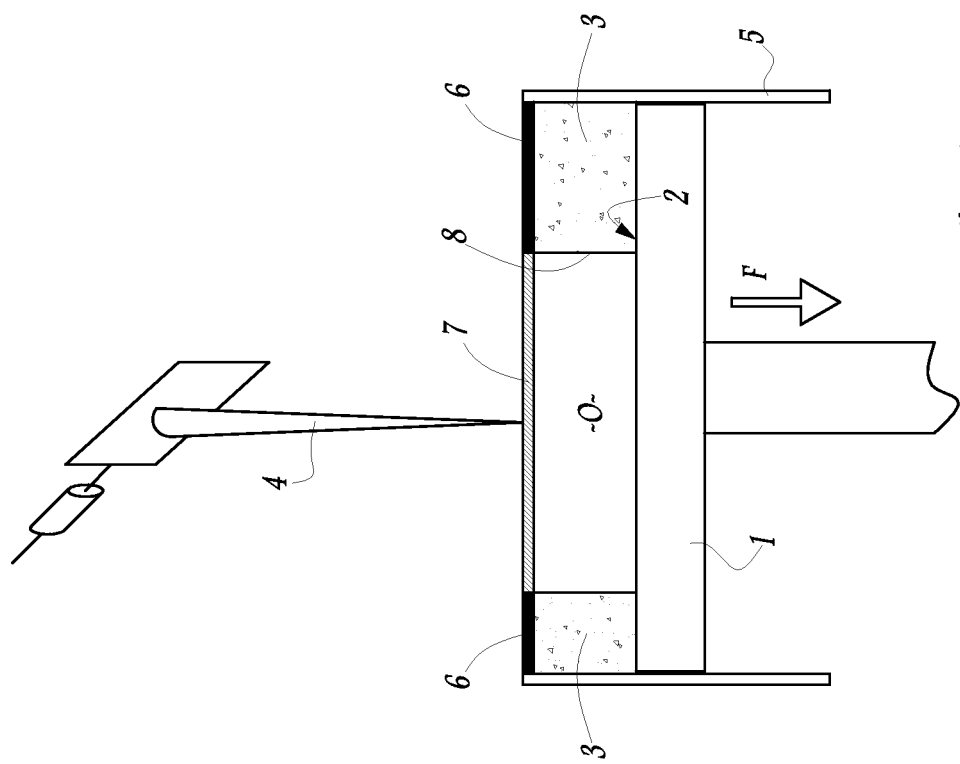
FIG. 1 is a schematic side view of the production of an object by means of a method according to the prior art, wherein the object is represented partially finished.

In FIG. 1, a plate 1 acts as a work area. The plate 1 has a plane surface 2 whereon a powder 3 is spread. The term powder in this instance denotes a powder or powder mixture, regardless of the nature of the powder(s), i.e. mineral or metallic.

This powder 3 is solidified using a laser beam 4, i.e. sintered, to produce the walls of an object O. The plate 1 is translatably movable along a vertical direction with reference to FIG. 1. It is movable in a sleeve 5, along the arrow F, so as to be lowered so that a member for spreading and supplying powder, not shown and known per se, can provide at the same level, a further layer 6 of powder 3. This layer 6, represented by a bold solid line for clear legibility, is spread and compacted before solidifying using a laser on the previously layer of powder that has already been sintered. In other words, using this method, layer by layer, the walls of the object O are produced. The object is represented schematically in the form of a rectangle, it being understood that it may a more complex shape. Each layer of solidified powder represents a section of a wall of the object O.

On either side of an area 7 of sintered powder 3, an area of the layer 6 of non-sintered and compacted powder 3 remains. The area 7 sintered by the laser beam 4 corresponds to a portion of at least one surface 80, 81, 82, 9 of the object O illustrated in FIGS. 1 to 5 and 7.

Figure 2:
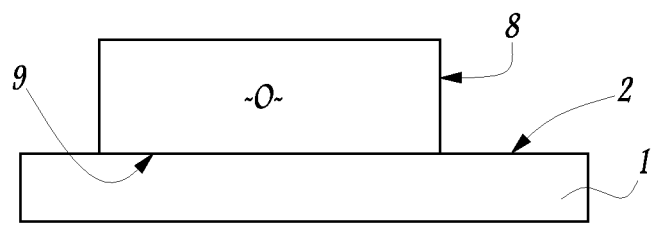
FIG. 2 is a schematic side view of a finished object, after solidification, in position on a plate acting as a work area, wherein the whole exhibits no deformation.

Such an object O, which is finished and free from deformation, is illustrated in position on the plate 1 in FIG. 2. In this case, the surfaces in contact with the plate 1 and the object O, i.e. with reference to FIG. 2, the top surface 2 of the plate 1 and the bottom wall surface 9 of a bottom wall of the object O, are plane and free from deformation. In other words, the surfaces 2, 9 of the plate 1 and the object O, respectively, are in contact on the entire respective areas thereof. The object O thus has an optimal quality.

Figure 3:
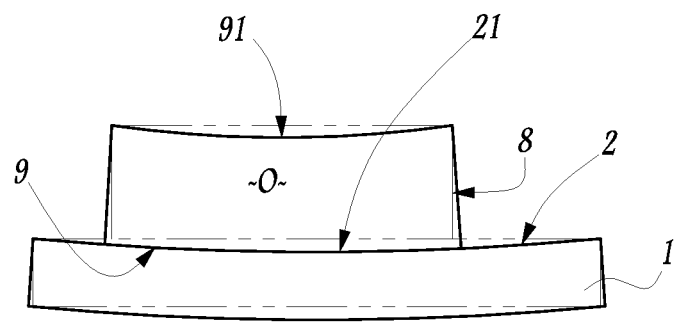
FIGS. 3 and 4 illustrate side views of the finished object and the plate, in the case of both known types of deformation, wherein the object and plate, without deformation, are illustrated with phantom lines.

If, as shown in FIG. 3, the temperature T0 of the sintered object O is greater than the temperature T1 of the plate 1, during the same sintering method, but the expansion coefficient D0 of the object is greater than the expansion coefficient D1 of the plate 1, i.e. T0>T1 and D0>D1, the object O expands first and, due to the dimensions and volume thereof, induces a type of deformation also affecting the plate 1. It should be noted that, in general, the temperature T0 of the object O is greater than the temperature T1 of the plate 1 since the energy emitted by the laser impacts the object O first and primarily.

In this case, the surfaces 9, 2 of the object O and the plate 1 in contact are not plane but are concave for the surface 2 and convex for the surface 9. The concavities 21, 91 of the surfaces 2, 9 are thus oriented upwards, with reference to FIG. 3.

Figure 4:
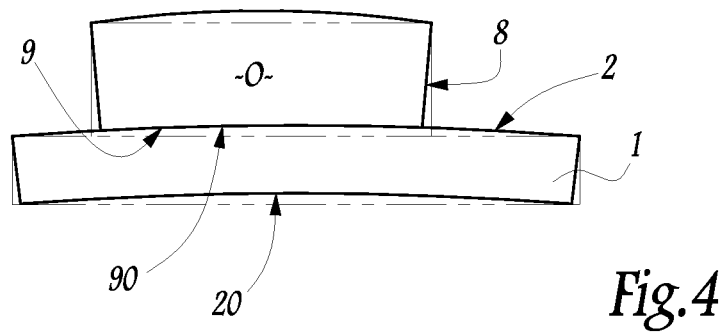

If, as illustrated in FIG. 4, the temperature T0 reached by the object O, once sintered, is greater than the temperature T1 reached by the plate 1, during the same sintering method, and the expansion coefficient D0 of the object is less than or equal to the expansion coefficient D1 of the plate 1, i.e. T0>T1 and D0≤D1, a second type of deformation of the plate 1 inducing similar deformation of the object O is observed.

In this case, the surface 2, 9 of the plate 1 and the object O in contact are no longer plane but the surface 2 is convex and the surface 9 is concave. Such a deformation of the surfaces 2, 9 induces similar deformation of the other surfaces of the plate 1 and the object O. In other words, the assembly consisting of the plate 1 and object O is bent such that the concavities 20, 90 of the surfaces 2, 9 are oriented in the same direction, i.e. downwards, with reference to FIG. 4.

In other words, in this design, the plate 1 and object O assembly is bent in the opposite direction with respect to that represented in FIG. 3.

It should be noted that, if the expansion coefficients D0 and D1 of the object O and plate 1 are similar, i.e. D0≈D1 and the plate 1 is at a temperature T1 less than that T0 of the object O, i.e. T1<T0, a type of deformation similar to that illustrated in FIG. 3 is observed. The concavities 21, 91 of the surfaces 2, 9 are oriented upwards with reference to FIG. 3.

To prevent, or at least limit, the appearance of these concave or convex deformations during the method for manufacturing the object, a member for absorbing deformations 12 inserted between the surfaces 9, 2 of the object O and the plate 1 is produced during the manufacturing method. The surface 9 is part of at least a portion of a bottom wall of the object O. This absorbing member 12 comprises a substrate suitable for absorbing the deformations due to the effects of the difference between the temperatures T0, T1 and/or the expansion coefficients D0, D1, regardless of the type of deformation.

This deformable substrate 12 is advantageously produced during the method for sintering the powder 3 i.e. during the method for manufacturing the object by solidifying the powder using a laser. In this instance, it is produced before performing a first solidification, using the laser beam 4, of the first layer 6 of powder 3 forming a bottom wall of the object O.

For this, a substrate 12 is formed in a layer 6 of powder, of the same type as that constituting the object O. Alternatively, the powder used is different to the powder constituting the object O.

Advantageously, as represented in FIGS. 5 to 8, the substrate is formed of a plurality of flat strips 120, distributed over a surface area equivalent to that of the base of the object to be manufactured. Each strip 120 has a minimum length corresponding to the width of the wall of the object to be manufactured, over a height of 2 mm to 10 mm for a thickness of 0.1 mm to 0.5 mm. The maximum length of each strip 120 is approximately 30 mm. To optimise the absorption of the deformations for widths of the object O greater than 30 mm, a plurality of strips 120 are arranged behind each other, at intervals of approximately 0.5 mm, ensuring that these strips 120 having the same length. For example, for a width of the object O of 31 mm, two strips 120 are produced, measuring 15.25 mm in length at 0.5 mm intervals.

These strips 120 are spaced at regular intervals and parallel with each other in the absence of deformation. The space E between two adjacent strips 120 is between 0.1 mm and 1 mm. This space E is suitable for the geometry of the object O to be manufactured. Each strip 120 is attached by one end 13 to the plate 1 and by another end 14 to the object O.

As illustrated in FIGS. 5 and 7, the strips 120 are identical and occupy the entire available surface area of the surface 9 of the object O intended to be facing the complementary surface 2 of the plate 1. In an alternative embodiment not shown, these strips 120 are only arranged on a portion of these surfaces 2, 9, in this instance at the areas corresponding to the finished sides of the object.

In one embodiment not shown, the strips are not identical, the shape and/or size thereof varying according to the position occupied.

The choice made for the density and position of the strips 120 is dependent on the expected deformations and/or dimensions of the final object.

The use of strips 120, to produce a substrate 12 makes it possible to discharge similarly to a heat sink a portion of the thermal energy supplied by the laser beam 4, by means of the space E between two adjacent strips 120 and to create a sufficiently flexible connection between the plate 1 and the object O to be deformed and absorb the deformations, in an amplified manner in relation to the deformations applied to the object and the plate. In other words, the strips 120 are deformed more rapidly and with greater amplitude than the object O and the plate 1. In this way, they absorb most of the deformations, making it possible to optimise the retention of the nominal dimensional characteristics of the object O and the plate 1.

Such a flexible connection between the object O and the plate 1, due to the dimensions of each end 13, 14 of the strips 120, is sufficiently fragile to enable, when the object O is finished, easy separation between the strips 120, the object O and the plate 1 by means of techniques known per se, for example by shearing with a sharp tool. In other words, the strips 120 are easy to destroy when the object is produced and it is sought to separate same from the plate, while limiting any further machining of the object O.

FIG. 5 illustrates a first type of deformation with the concavities 21, 91 of the surfaces 2, 9 illustrated with upward phantom lines, when the strips 120 have absorbed the deformation. In this case, the strips 120, at least those close to the periphery of the absorbing member 12 are inclined towards the object O. As shown in FIG. 5, this inclination is variable; it is generally greater at the periphery, in the vicinity of the sides of the object O, than at the centre of the absorbing member 12. The strips 120 situated in the central position remain substantially perpendicular to the surface 2 of the plate 1 during the absorption of the deformation.

FIGS. 7 and 8 illustrate a second type of deformation with the concavities 20, 90 of the surfaces 2, 9 oriented in the other direction in relation to FIGS. 5, 6, i.e. situated towards the bottom wall with reference to FIG. 7. As above, the concavities 20, 90 are represented with phantom lines. The strips 120 then tend to be oriented towards the outside of the absorbing member 12. The most inclined strips 120 are situated at the periphery, in the vicinity of the sides of the object O. The strips situated in the central position also remain, during the absorption of the deformation, substantially perpendicular to the surface 2 of the plate 1.

Such an absorbing member may also be positioned between at least two areas of at least one object, i.e. a step for manufacturing a deformable substrate may be included, not only as described, between the plate 1 and an object O, but between two areas of an object O or between two objects liable to be deformed for example, because they do not have the same thermal expansion coefficients and/or because they are made of two different materials. In this case, one surface of the object acts as the work area receiving the powder to be compacted and sintered.

The invention claimed is:

1. Method for manufacturing an object by solidifying powder using a laser beam including at least steps consisting of:
    a) depositing a first layer of powder onto a work area constituted by a plate, the plate being part of a manufacturing apparatus and not being part of the manufactured object,
    b) after step a), compacting said first layer,
    c) solidifying a first area of the first layer compacted in step b) using a laser beam, said first area corresponding to a section of a bottom wall of a finished object,
    d) repeating steps a) to c) to provide further layers until the object is obtained, and
    e) before step c), producing, by solidifying a powder using the laser beam, a member for absorbing deformations arranged between the work area and an area to be part of an area corresponding to a section of the bottom wall of the finished object produced in step c), wherein the absorbing member produced in step e) comprises a deformable substrate consisting of a plurality of extensible and compressible strips suitable for connecting a surface of the plate to the first area constituting a surface of the bottom wall of the object.

2. Method according to claim 1, wherein the extensible and compressible strips are spaced at regular intervals.

3. Method according to claim 1, wherein the extensible and compressible strips, before any absorption of deformations, are parallel.

4. Method according to claim 1, wherein the powder constituting the deformable substrate is identical at least to the first layer of powder constituting the object.

5. Method according to claim 1, wherein the powder constituting the deformable substrate is different at least to the first layer of powder constituting the object.

6. Method according to claim 1, wherein the extensible and compressible strips are flat strips, distributed over a surface area equivalent to a surface area of a base of the object to be manufactured.

7. Method according to claim 1, wherein each strip has a minimum length corresponding to a width of the wall of the object to be manufactured.

8. Method according to claim 1, wherein each strip has a height of 2 mm to 10 mm and a thickness of 0.1 mm to 0.5 mm.

9. Method according to claim 1, wherein the deformable substrate is configured for discharging a portion of thermal energy supplied by the laser beam, by means of a space between two adjacent said extensible and compressible strips.

10. Method according to claim 1, wherein during said steps a), b), c), and d), the plate is located within a sleeve and, after step c) and prior to providing each further layer of the powder onto the work area, the plate is translatably moved along a vertical direction along a length of the sleeve to lower the plate to provide space within the sleeve for repeating steps a), b), and c) to provide each further layer of the powder onto the work area.

* * * * *